W. C. LEONARD.
FEEDER FOR GRAIN SEPARATORS.
APPLICATION FILED JAN. 18, 1921.
1,400,688.
Patented Dec. 20, 1921.
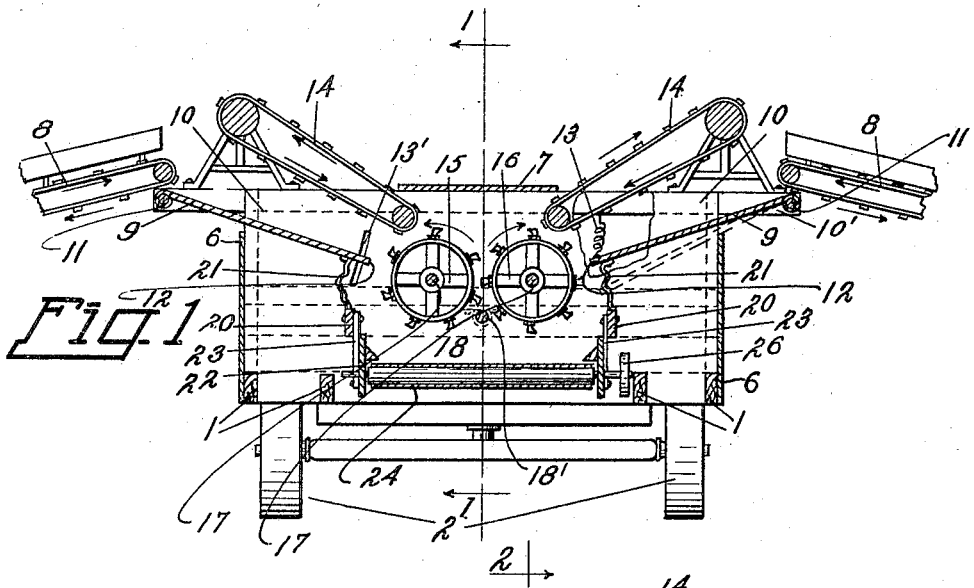
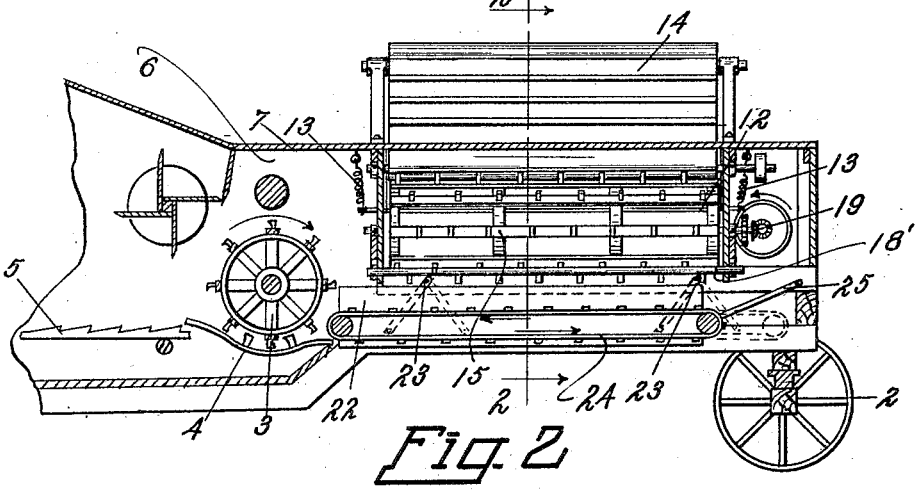
Inventor
William C. Leonard

UNITED STATES PATENT OFFICE.

WILLIAM CLYDE LEONARD, OF LEWISTON, IDAHO, ASSIGNOR TO THE LEONARD ROLLER GEAR DRIVE THRESHER COMPANY, OF LEWISTON, IDAHO.

FEEDER FOR GRAIN-SEPARATORS.

1,400,688. Specification of Letters Patent. Patented Dec. 20, 1921.

Application filed January 18, 1921. Serial No. 438,128.

*To all whom it may concern:*

Be it known that I, WILLIAM C. LEONARD, a citizen of the United States, residing at Lewiston, in the county of Nez Perce and State of Idaho, have invented certain new and useful Improvements in Feeders for Grain-Separators, of which the following is a specification.

My present invention relates to improvements in feeders for grain separators for use in handling grain, as wheat, in connection with the standard form or other form of mechanism for subsequently separating and cleaning the grain in approved manner.

In the process of threshing, or separation of the grain, I have found by experience and observation of machines with which I am familiar that a considerable loss in money value is sustained because of the cracking of wheat heads, and also of the failure by the mechanism employed to thoroughly thresh or beat out the kernels, resulting in loss of grain over the back end of the straw pile. Some of these objectionable features are due to uneven and irregular action of the feeding mechanism of the threshing machine or separators now in use, which results in waste and prevents effective action of the mechanism. In some instances when the bundles or sheaves of grain are furnished too rapidly to the feeding mechanism of the thresher, the operating parts of the feeding mechanism become choked, and when the feed is slow and scant, the machinery has a tendency to excessive feed, thus feeding the material to the separating mechanism in such manner as to preclude effective and thorough separation and cleansing.

To overcome these and other difficulties I provide means for automatically establishing a uniform flow of grain to the feed mechanism, and utilize mechanism for equal and even distribution of the grain to the threshing machinery or devices, as will be hereinafter more fully described and claimed.

In the accompanying drawings I have illustrated a feed mechanism for a threshing machine as an example of the physical embodiment of my invention, in which the coöperating parts are combined and arranged according to the best mode I have thus far devised for the practical application of the principles of my invention.

Figure 1 is a transverse sectional view through a feed mechanism involving my invention, taken at line 2—2 of Fig. 2.

Fig. 2 is a longitudinal sectional view at line 1—1 of Fig. 1.

In order to illustrate my invention and show the relation of parts I have utilized a portion of the framework 1 of a portable threshing machine possessing wheels as 2, and the main threshing cylinder 3 is illustrated as arranged transversely of the machine above the concave 4. One of the oscillating members of the threshing machine is also indicated at 5 supported between the side walls 6, 6, which, as extended, form the feed hopper with a closed top 7. For the purpose of facilitating the rapid and convenient movement of the grain to the feeding mechanism, I employ a pair of laterally disposed elevators or conveyers 8, 8 in the form of endless aprons or belts, alined, and with their upper flights traveling toward the hopper. These conveyers are operated by suitable mechanism (not shown) and reach the top, at opposite sides, of the hopper formed by the side walls 6. Within the hopper and arranged in alinement with the carriers or conveyers 8, 8, are complementary feed chutes or inclined tables 9, 9 that form extensions of the respective conveyers, and from the latter the material is deposited on these chutes or boards. Lateral openings are provided, as at 10, 10 at the top of the side walls, and the outer ends of these chutes, which project through the openings are pivoted at 11 in a bracket 10' as shown. The longitudinal axes of the pivots or pivot bars 10 of the chutes extend longitudinally of the machine, and the outer ends of the chutes are elevated, in normal position, with the inner free ends 12 of the chutes declining toward the center of the hopper as shown.

The chutes are resiliently supported on their pivots, by suspending devices at the free ends, a spring 13 being utilized for the purpose, having one end attached to the chute and the other or upper end attached to the framework of the hopper. There are at least two of these springs for each chute, at the sides thereof, and the end walls of the hopper may be slotted as at 13' in Fig. 1 for connection to the springs and for freedom of movement of the free ends of the chutes. The material is supplied to the chutes from the conveyers and moves by gravity toward the center of the hopper, but to assist and guide the material in this movement I provide for each chute an endless guide belt 14, with its lower flight moving in the direction of the declination of the chute to frictionally engage and feed the material toward the end of the chute, and the distributing cylinders 15 and 16. Thus the material is supplied to the chutes and the load, or weight imposed on the resiliently suspended chutes by the load of the material automatically adjusts the position of the chutes beneath the guide belts 14, a heavy mass of material of course depressing the chute beneath the belt and against the tension of the suspending springs for the chutes. A change in the weight of the load on the chute of course permits the springs to elevate the chutes, thus holding the mass of material in position to be contacted with by the lower flight of the guide belt to provide a continuous and even flow of the grain on the chute regardless of the load of material thereon.

The two distributing cylinders 15 and 16 are in the form of skeleton drums with raking teeth thereon, and as the cylinders revolve in opposite directions, each cylinder draws the grain from the complementary chute to force or carry it down in the hopper. The cylinders are fixed on parallel, revolving shafts 17 spaced equidistant at the sides of the longitudinal axis of the hopper and disposed in a well or space 18, and a releasing rod or bar 18' is disposed parallel with the cylinders between them and below their axes, to strip from the cylinders any material that may not fall from the revolving cylinders. The shafts of the cylinders are revolved from a train of gears 19 suitably driven, and the cylinders are geared together to revolve in opposite directions, in usual manner.

Within the hopper, and below the free ends of the chutes are provided a pair of spaced, fixed, longitudinally extending boards 20, to confine the material as it comes from the cylinders, and these boards are each connected with one of the chutes, at its free end by a flexible wall 21 which allows freedom of movement of the chutes, but forms an effective wall or extension above the board 20 to confine the material.

The side boards 20 are utilized to support a movable frame 22, which is rectangular in shape, centrally disposed in the lower portion of the hopper below the cylinders 15 16, and suspended from these boards by a suitable number of pivotal links 23. Within the frame and movable therewith, longitudinally of the thresher is an endless belt or conveyer apron 24, upon which the material is deposited, and by which it is conveyed to and delivered to the throat between the main threshing cylinder 3 and its concave 4. At one end a draw bar 25 is attached to the movable frame in order that the frame and its conveyer 24 may be swung on the pivotal links, by which they are suspended from the side boards, to retracted position as indicated lines in Fig. 2, to give access to the main cylinder and its concave for repair work, or for other purposes.

The several operating parts of the apparatus are actuated by suitable driving mechanism, a wheel 26 being shown in Fig. 1 to actuate the carrier or conveyer 24, and other necessary accessories required are of course utilized, although not herein illustrated.

From the above description and the drawings, the construction and operation of the feed mechanism will be clearly understood, and it will be apparent that the material or grain is fed in a continuous and regular or uniform flow to the distributing cylinders and the bunches or bundles of grain broken up or disintegrated by the action of the spikes or spurs on the revolving cylinders. From the cylinders the grain falls to the apron 24 with the material in an open or lofty condition and the apron, by its continuous operation feeds the grain uniformly to the throat of the threshing cylinder, as described.

Having thus fully described my invention, what I claim as new and desire to secure by Letters Patent is—

1. The combination in a feed mechanism with a pair of depressible, resiliently supported chutes, of a pair of distributing cylinders, a fixed board beneath each chute and a flexible wall connecting each wall with a respective chute, and a conveyer below the cylinders and supported from said boards.

2. The combination in a feed mechanism with a pair of distributing cylinders as described, of a pair of complementary, resiliently supported, depressible chutes, a fixed board beneath the free end of each chute and a flexible wall connecting said board and respective chute, a movable frame suspended from said boards, and an endless conveyer apron operatively supported in said frame.

In testimony whereof I affix my signature.

WILLIAM CLYDE LEONARD.